Sept. 23, 1969     R. L. WILSON     3,468,585

REPEATER RELAY VALVE DEVICE

Filed Nov. 21, 1967                           2 Sheets-Sheet 1

INVENTOR.
RICHARD L. WILSON
BY
*A. G. Steinmiller*
ATTORNEY

INVENTOR.
RICHARD L. WILSON

United States Patent Office 3,468,585
Patented Sept. 23, 1969

3,468,585
REPEATER RELAY VALVE DEVICE
Richard L. Wilson, Monroeville, Pa., assignor to Westinghouse Air Brake Company, Wilmerding, Pa., a corporation of Pennsylvania
Filed Nov. 21, 1967, Ser. No. 684,764
Int. Cl. B60t *17/06, 11/26*
U.S. Cl. 303—66                              13 Claims

ABSTRACT OF THE DISCLOSURE

A repeater relay valve device for controlling an independent fluid pressure supply apparatus provided on a special car located at or near midway the length of a long train so as to duplicate in that portion of the train brake pipe extending from the special car to the last car in the train the same pressure variations as is effected in that portion of the brake pipe extending from the locomotive to the special car by manual operation of the engineer's brake valve device carried on the locomotive, irrespective of the end of the train from which initial charging of the brake pipe from a source of pressure supply off the train was effected prior to coupling the locomotive to one end of the train.

BACKGROUND OF THE INVENTION

Figure 1:
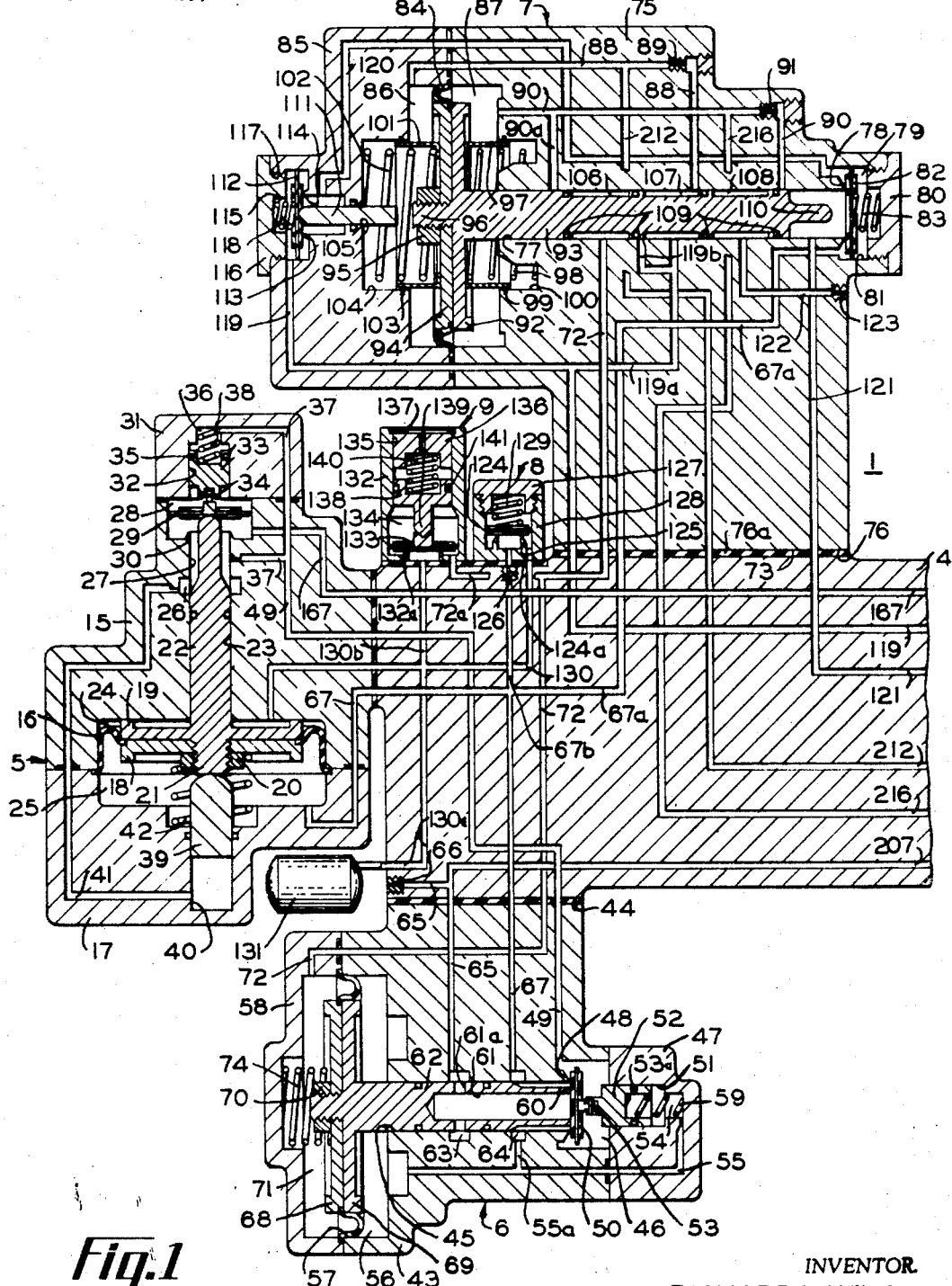

In recent years a variety of designs of repeater relay valve devices have been devised for special cars located midway the length of long trains. One of the present day repeater relay valve devices for such special cars provides a selector valve mechanism movable to one or the other of two positions according to which end of a train a fluid under pressure supply is connected for effecting initial train brake pipe charging, as for example from a yard charging plant, prior to coupling a locomotive to one of the ends of the train. This selector valve mechanism when moved to that one of its two positions corresponding to that end of the train to which the initial charging supply of fluid pressure is connected provides for the flow of fluid under pressure from the independent fluid supply apparatus on the special car to that portion of the train pipe extending from the special car to the other end of the train to effect charging thereof. However, if the locomotive be coupled to this aforesaid other end of the train, variations in the pressure in that portion of the train brake pipe extending from the special car to the last car in the train cannot be controlled by manual operation of the engineer's brake valve device at the locomotive since there can be no flow from the fluid supply apparatus to that portion of the train brake pipe extending from the special car to the last car via the selector valve mechanism.

Accordingly, it is the general purpose of this invention to provide a novel repeater valve device for a special car located midway the length of a long train operable, irrespective of the end of the train from which initial train brake pipe charging is effected and irrespective of the end to which a locomotive may subsequently be coupled, in response to variations in the pressure in that portion of the brake pipe extending from the locomotive to the special car to cause corresponding variations in the pressure in that portion of the brake pipe extending from the special car to the last car in the train.

SUMMARY OF THE INVENTION

According to the present invention, a novel repeater valve device is provided which comprises a repeater relay valve device normally operable in response to variations in the pressure in that portion of the brake pipe extending from the locomotive to the special car to effect corresponding variations in the pressure in that portion of the brake pipe extending from the special car to the last car in the train, a detector valve device operable by fluid under pressure supplied thereto, upon the repeater relay valve device effecting a pressure release operation, to effect the supply of fluid under pressure from a high pressure source to a selector valve device previously positioned in accordance with the end of the train from which initial charging was effected via a directional valve device, also previously positioned in accordance with the end of the train from which initial charging was effected, to cause the selector valve device to be positioned in accordance with the end of the train to which the locomotive is connected irrespective of the end of the train from which initial train brake pipe charging was effected.

Figure 1A:
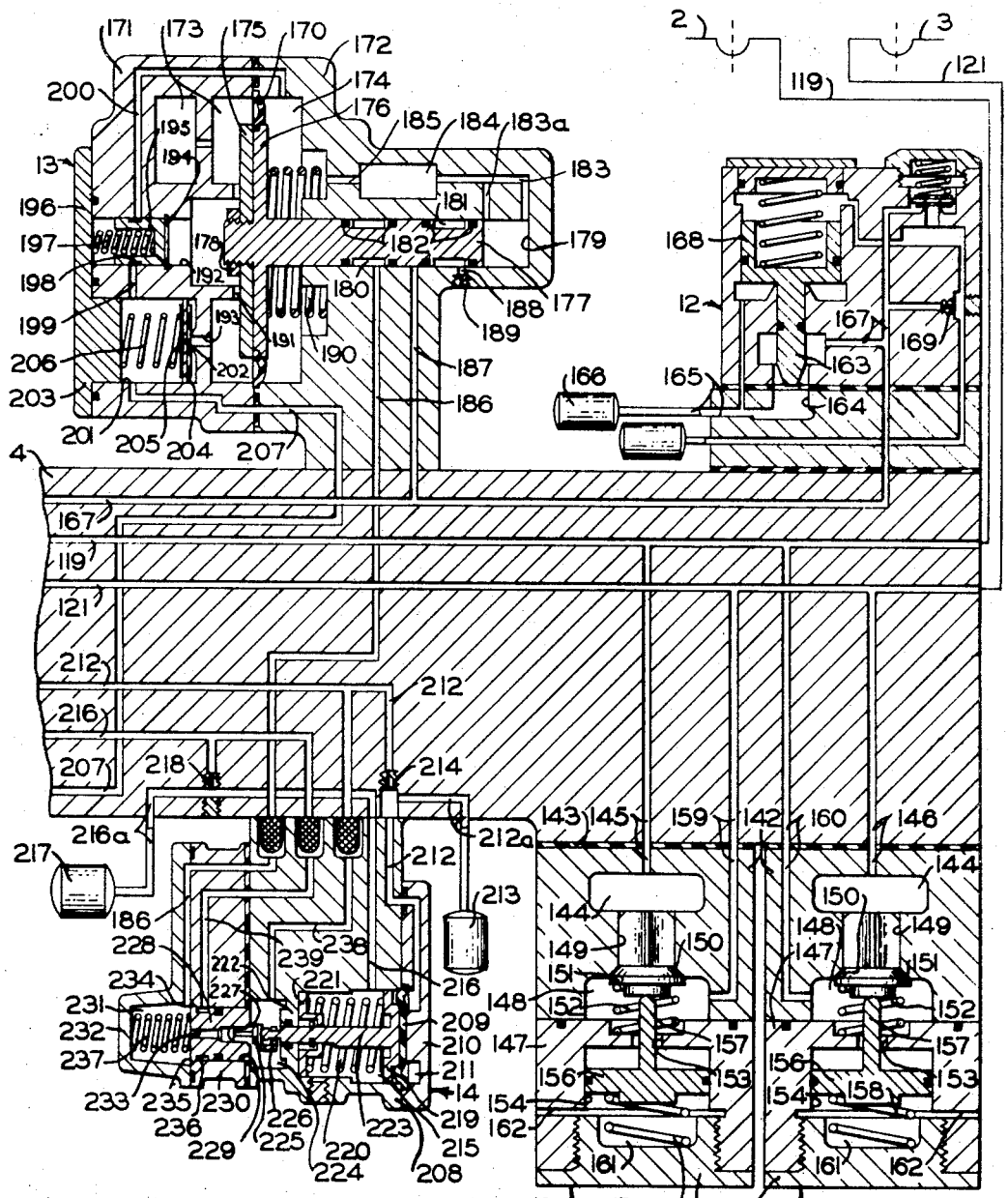

In the accompanying drawings:
FIG. 1 and FIG. 1A when taken together such that the right-hand edge of FIG. 1 is matched with the left-hand edge of FIG. 1A constitutes a diagrammatic view of a repeater relay valve device embodying the invention.

In FIGS. 1 and 1A of the drawings is shown a repeater relay valve device 1 constructed in accordance with the invention. This repeater relay valve device 1 is installed on a special utility car carrying an independent source of fluid pressure, said car being disposed substantially midway the length of a long freight train and connected to the portions 2 and 3 of the train brake pipe extending in opposite directions from the special utility car to the two ends of the train.

The repeater relay valve device 1 comprises a pipe bracket 4 having a plurality of faces to which are secured in sealed relation, a cut-off relay valve device 5 (FIG. 1), a repeater relay valve device 6, a selector valve device 7, a volume discharge check valve device 8, a two-step check valve device 9, a pair of identical by-pass check valve devices 10 and 11, (FIG. 1A), a variable orifice type of feed valve device 12, a detector valve device 13, and a directional valve device 14.

The cut-off relay valve device 5 (FIG. 1) comprises a body or casing 15 which is secured to the left-hand face of the pipe bracket 4 by any suitable means (not shown), and a diaphragm or movable abutment 16 that has its outer periphery clamped between the lower end of the casing 15 and a cover member 17 secured to casing 15 by any suitable means (not shown).

The inner periphery of the diaphragm 16 is clamped between an annular diaphragm follower plate 18 and a diaphragm follower 19 by a nut 20 that has screw-threaded engagement with a screw-threaded stem 21 extending from the lower side of the diaphragm follower 19 through the follower plate 18.

Integral with the diaphragm follower 19 and extending from the upper side thereof is a valve operating stem 22 comprising two portions of unequal diameter the larger of which is slidably mounted in a bore 23 provided in the casing 15.

Two chambers 24 and 25 are formed respectively on the opposite sides of the diaphragm 16. Chamber 24 is connected by the bore 23 to a second chamber 26 which in turn is connected by a coaxial bore 27 to a third chamber 28. Contained in the chamber 28 is a flat disc-type valve 29 which cooperates with an annular valve seat 30 that is formed on the casing 15 at the upper end of the bore 27 and projects into the chamber 28.

Secured to the upper end of the casing 15 by any suitable means (not shown) is an upper cover member 31 that is provided with a counterbore 32 that is coaxial with the valve seat 30 and coextensive with the chamber 28. Slidably mounted in the counterbore 32 is a piston 33 that is operatively connected to the valve 29 by a pin 34 and is provided with a peripheral annular groove in which is disposed an O-ring 35 to prevent leakage of fluid under pressure from the chamber 28 below the piston 33 to a chamber 36 above the piston 33, into which chamber 36 opens one end of a passageway 37 that extends through the cover member 31 and the casing 15 and opens at its other end at the wall surface of the bore 27 intermediate the ends thereof in order that fluid under pressure supplied by the feed valve device 12 to the relay valve device 5 in a manner hereinafter described may flow to the chamber 36 and act on top of the piston 33 to balance the pressure acting on the valve 29 and stem 22 when valve 29 is unseated from the valve seat 30 since the chamber 28 is constantly supplied with fluid under pressure from the feed valve device 12. A spring 38 is interposed between the cover member 31 and the upper side of the piston 33 to bias this piston and the valve 29 downward so that the valve 29 is moved into contact with its seat 30 except when held unseated therefrom in a manner hereinafter described.

The lower end of the valve operating stem 22 is pressure balanced by means of a plunger 39 having the same diameter as the piston 33 and slidably mounted in a blind bore 40 provided in the cover member 17 into which blind bore opens one end of a passageway 41 that extends through the cover member 17 and casing 15 and opens at its other end into the chamber 26. The bore 27 opens into the chamber 26 as aforestated. Therefore, fluid under pressure is supplied from the feed valve device 12 to the interior of the bore 27, as hereinbefore explained, and will flow therefrom to the blind bore 40 via the chamber 26 and passageway 41. A spring 42 is interposed between the follower plate 18 and the cover member 17 to normally bias the diaphragm follower 19 against the casing 15 and thereby maintain the valve 29 unseated from its seat 30 via the stem 22.

The fluid pressure force acting upward on the plunger 39 is equal and opposite to the downwardly exerted fluid pressure force acting on the area of the piston 33 thereby balancing the forces acting on the valve operating stem 22 and the valve 29 while this valve is unseated from its seat 30.

The repeater relay valve device 6 comprises a casing 43 which is secured to a bottom bolting face 44 formed at the left-hand end of the pipe bracket 4. This casing 43 is provided with a bore 45 that opens at its right-hand end into a supply valve chamber 46 formed by the cooperative relation of the casing 43 and an end cover 47 secured to the right-hand end of the casing 46 by any suitable means (not shown). This bore 45 has at its right-hand end an annular supply valve seat 48. Opening into the chamber 46 is one end of a passageway 49 that extends through the casing 43, pipe bracket 4, and the casing 15 of the cut-off relay valve device 5 and opens at its other end into the hereinbefore-mentioned passageway 37 intermediate the ends thereof.

Disposed in the chamber 46 is a flat disc-type valve 50 which cooperates with the annular supply valve seat 48 when seated thereon to close communication between the chamber 46 and the interior of the bore 45.

The end cover 47 is provided with a counterbore 51 that is coaxial with the bore 45. Slidably mounted in the counterbore 51 is a piston 52 that is operatively connected to the valve 50 by a pin 53 and is provided with a peripheral annular groove in which is disposed an O-ring 53a to prevent leakage of fluid under pressure from the chamber 46 at the left-hand side of the piston 52 to a chamber 54 at the right-hand side of this piston. Opening into the chamber 54 is one end of a passageway 55 that extends through the end cover 47 and casing 43 and opens at its other end into a chamber 56 formed by a cooperative relationship of the casing 43 and a diaphragm or movable abutment 57 that has its outer periphery clamped between the casing 43 and a cover 58 secured to the casing 43 by any suitable means (not shown). A spring 59 is disposed between the end cover 47 and the right-hand side of the piston 52 to bias this piston and the valve 50 to the position shown in FIG. 1 of the drawings in which the valve 50 is seated on the supply valve seat 48 and also on an annular exhaust valve seat 60 formed at the right-hand end of a blind bore 61 provided in a valve stem 62 that extends with a sliding fit through the bore 45.

The casing 43 is provided intermediate the ends of the bore 45 therein with two spaced-apart annular chambers 63 and 64. The chamber 63 is open to atmosphere via a passageway 65 extending through the casing 43 and the pipe bracket 4 and a choke 66 carried by the pipe bracket 4, the size of the choke 66 being such as to provide for releasing fluid under pressure from the train brake pipe at a service rate. Furthermore, the chamber 63 is open to the interior of the blind bore 61 via a crossbore 61a provided in the valve stem 62.

Opening into the chamber 64 is one end of a branch passageway 55a that at its opposite end opens into the passageway 67 that extends through the casing 43, pipe bracket 4, casing 15 and cover member 17 and opens at its other end into the hereinbefore mentioned chamber 25 below the diaphragm 16 of the cut-off relay valve device 5.

The inner periphery of the above-mentioned diaphragm 57 is clamped between an annular diaphragm follower plate 68 and a diaphragm follower 69 formed integral with the valve stem 62 intermediate the ends thereof by a nut 70 that has screw-threaded engagement with corresponding external screw threads formed on the left-hand end of the valve stem 62.

The diaphragm 57 cooperates with the casing 43 and the cover 58 to form respectively on the opposite sides of this diaphragm the above-mentioned chamber 56 and a chamber 71 into which opens one end of a passageway 72 that extends through the casing 43 and pipe bracket 4 to a bolting face 73 formed on the upper side of the pipe bracket 4 adjacent the left-hand end thereof.

Interposed between the cover 58 and the follower plate 68 is a light spring 74 which is effective to bias the diaphragm 57 and valve stem 62 to the position shown in FIG. 1 in which the exhaust valve seat 60 abuts the left-hand side of the valve 50 it being understood that the spring 59 is stronger than the spring 74 in order that the spring 59 is effective to maintain the valve 50 in seated contact with the supply valve seat 48.

The selector valve device 7 comprises a casting 75 that is provided with a bolting face 76 between which and bolting face 73 on the pipe bracket 4 is disposed a gasket 76a. The selector valve 7 is secured by any suitable means (not shown) to the pipe bracket 4.

As shown in FIG. 1 of the drawings, there are six ports opening at the surface of the bolting face 76 which are in alignment with a corresponding number of ports in the bolting face 73 of the pipe bracket 4 and the gasket 76a. These ports are connected by corresponding passageways that extend respectively through the pipe bracket 4 and the casting 75. Consequently, it will be understood that the hereinbefore-mentioned passageway 72 in the pipe bracket 4 extends from the pipe bracket 4 through the casing 75 and opens at the wall surface of a bore 77 extending longitudinally through this casing. This bore 77 has formed at its right-hand end an annular valve seat 78 that projects into a chamber 79 formed by the cooperative relation of the casing 75 and a screw-threaded plug 80 that has screw-threaded engagement with corresponding screw threads formed in the outer end of a counterbore 81 provided in the casing 75 coaxial with the bore 77 and opening into the chamber 79.

Disposed in the chamber 79 is a flat disc-type valve 82 between which and the plug 80 is interposed a spring 83 that is normally effective to bias the valve 82 against its seat 78 to close communication between the chamber 79 into which opens one end of a branch passageway 67a of the hereinbefore-mentioned passageway 67 and the interior of the bore 77.

The selector valve device 7 further comprises a movable abutment or diaphragm 84, the outer periphery of which is clamped between the left-hand end of the casing 75 and a cup-shaped cover member 85 secured to the casing 75 by any suitable means (not shown). The diaphragm 84 cooperates respectively with the casing 75 and the cover 85 to form on opposite sides of the diaphragm two chambers 86 and 87. Opening into the chamber 86 is one end of a passageway 88 that extends through the cover member 85 and casing 75 and opens at its other end at the wall surface of the bore 77 intermediate the ends thereof, there being a choke 89 disposed in this passageway the size of which choke determines the rate of flow of fluid under pressure therethrough. Opening into the chamber 87 is one end of a passageway 90 that extends through the casing 75 and opens at its other end at the wall surface of the bore 77 at a location on the right-hand side of the location at which the hereinbefore-mentioned other end of the passageway 88 opens at the wall surface of the bore 77. A choke 91 is disposed in the passageway 90 which has a branch passageway 90a one end of which opens into the passageway 90 intermediate the choke 91 and the chamber 87 and the other end of which opens at the wall surface of the bore 77 adjacent the left-hand end of this bore.

The center of the diaphragm 84 is clamped between a diaphragm follower 92 that is integral with a multi-position spool-type positioning valve 93 slidably mounted in the bore 77 and an annular diaphragm follower plate 94 by a nut 95 that has screw-threaded engagement with a stem 96 extending from the left-hand side of the diaphragm follower 92 through the follower plate 94. Disposed in surrounding relation to the spool-type positioning valve 93 and interposed between the casing 75 and an inturned flange at one end of a spring seat 97 is a first spring 98 which is effective to normally urge an outturned flange at the other end of this spring seat 97 toward and into contact with a snap ring 99 that is inserted in a groove formed in the wall surface of a counterbore 100 that is coaxial with the bore 77 provided in the casing 75. Disposed in the chamber 86 and interposed between the cover member 85 and an inturned flange at one end of a second spring seat 101 is a second spring 102 having the same strength as the spring 98 and normally urging an outturned flange at the other end of this spring seat toward and into contact with a snap ring 103 that is inserted in a groove formed in the wall surface of a counterbore 104 that is coaxial with a bore 105 provided in the cover member 85 it being understood that this bore 105 is coaxial with the bore 77 in the casing 75.

The positioning valve 93 has three spaced-apart elongated peripheral annular grooves 106, 107 and 108 formed thereon. On the lands between these elongated peripheral annular grooves, and also adjacent the left-hand end of the elongated groove 106 and the right-hand end of the elongated groove 108, the positioning valve 93 has formed respective peripheral annular grooves in each of which is disposed an O-ring seal 109.

The positioning valve 93 has provided integral therewith at the right-hand end thereof a valve stem 110 for effecting unseating of the valve 82 from its seat 78 against the yielding resistance of spring 83 upon movement of the positioning valve 93 in the direction of the right-hand from its neutral position shown in FIG. 1 to which it is normally biased by the springs 98 and 102.

Slidably mounted in the bore 105 is a plunger 111 which, upon deflection of the diaphragm 84 more than a chosen amount in the direction of the left hand, is moved in the same direction to effect unseating of a flat disc-type valve 112 from an annular valve seat 113 formed at the right-hand end of a counterbore 114 that is coaxial with the bore 105. This counterbore 114 opens into a chamber 115 formed by the cooperative relation of the cover member 85 and a screw-threaded plug 116 that has screw-threaded engagement with corresponding screw threads formed in the outer end of a counterbore 117 provided in the cover member 85 coaxial with the bore 105 and opening into the chamber 115.

Disposed in the chamber 115 and interposed between the plug 116 and the left-hand side of the valve 112 is a spring 118 which is effective to normally bias this valve 112 into seating contact with its seat 113 to close communication between the chamber 115 into which opens one end of a passageway 119 and the interior of the counterbore 114 into which opens one end of a passageway 120.

The passageway 119 extends through the cover member 85, casing 75, and pipe bracket 4 and is connected by a pipe bearing the same numeral to a hose and hose coupling which in turn is connected to a corresponding hose and hose coupling at that end of the portion 2 of the train brake pipe that is adjacent one end of the special utility car. This passageway 119 has a first branch passageway 119a that opens at the wall surface of the bore 77 at a location at the left-hand side of the location at which the hereinbefore-mentioned passageway 88 opens at the wall surface of this bore, and a second branch passageway 119b that opens at the wall surface of the bore 77 at a location on the left-hand side of the location at which the first branch passageway 119a opens at the wall surface of this bore 77.

The passageway 120 extends through the cover member 85 and the casing 75 and opens at its opposite end into the hereinbefore-mentioned chamber 79.

Opening at the wall surface of the bore 77 adjacent the right-hand end thereof is one end of a passageway 121 that extends through the casing 75 and pipe bracket 4 and is connected by a pipe bearing the same numeral to a hose and hose coupling which in turn is connected to a corresponding hose and hose coupling at that end of the portion 3 of the train brake pipe that is adjacent the other end of the special utility car. Also opening at the wall surface of the bore 77 at a location intermediate the locations at which one end of the respective passageways 88 and 90 open at the wall surface of this bore is one end of an exhaust passageway 122 that extends through the casing 75 to the exterior surface thereof. The end of the exhaust passageway 122 opening at the exterior surface of the casing 75 is provided with internal screw threads which have screw-threaded engagement with external screw threads formed on an exhaust choke 123.

The volume discharge check valve device 8 comprises a cup-shaped casing 124 which is secured to a top bolting face 124a formed at the left-hand end of the pipe bracket 4 by any suitable means (not shown). This casing 124 is provided with an annular valve seat 125 which surrounds one end of a branch passageway 67b of the hereinbefore-mentioned passageway 67. A choke 126 carried by the pipe bracket 4 is disposed in the branch passageway 67b.

The open end of the cup-shaped casing 124 is closed by a screw-threaded plug 127 between which and a flat disc-type valve 128 is disposed a spring 129 for normally biasing the valve 128 against its seat 125 to close communication between the branch passageway 67b and a passageway 130 that extends through the casing 124, the pipe bracket 4 and the casing 15 of the hereinbefore-mentioned cut-off relay valve device 5 and opens into the chamber 24 in this valve device. A first branch passageway 130a of the passageway 130 extends through the pipe bracket 4 and is connected by a pipe bearing the same numeral to a volume reservoir 131, and a second branch passageway 130b of this passageway 130 extends through the pipe bracket 4 and opens at the surface of the hereinbefore-mentioned bolting face 124a thereon.

Secured by any suitable means (not shown) to the bolting face 124a on the left-hand side of the volume discharge check valve device 8 is a cup-shaped casing 132 of the two-step check valve device 9. This casing 132 has formed thereon an annular valve seat 132a into which opens the second branch 130b of the above-mentioned passageway 130. A flat disc-type valve 133 cooperates with the valve seat 132a to normally close communication between the second branch passageway 130b and a chamber 134 into which opens a branch passageway 72a of the hereinbefore-mentioned passageway 72.

The upper end of the casing 132 is provided with a bore 135 the outer end of which is closed by an annular member 136 that is retained therein by a snap ring 137 that is inserted in a groove formed in the wall of the bore 135.

Slidably mounted in the bore 135 below the member 136 is a piston 138 having integral therewith on the lower side thereof a stem 139. Interposed between the upper side of the piston 138 and the member 136 is a spring 140 which is normally effective via the piston 138 and its stem 139 to maintain the valve 133 seated on its seat 132a to close communication between the branch passageways 130b and 72a. The piston 138 is provided with a peripheral annular groove in which is disposed an O-ring seal 141 to seal against leakage of fluid under pressure from the chamber 134 below the piston 138 to atmosphere.

The by-pass check valve devices 10 and 11 (FIG. 1A) are identical in construction. Therefore, a description of one will suffice for both, it being undesrtood that corresponding parts of the valve device 11 have the same reference numerals as those of the valve device 10.

The check valve device 10 comprises a body 142 that is secured by any suitable means (not shown) to a bolting face 143 formed on the lower right-hand end of the pipe bracket 4. Provided in the body 142 is a chamber 144. Opening into the chamber 144 in the valve device 10 is one end of a passageway 145 that extends through the body 142 and the pipe bracket 4 and opens at its opposite end into the passageway 119 in the pipe bracket 4 intermediate the ends of this passageway 119. Likewise, a passageway 146 that opens at one end into chamber 144 in the valve device 11 extends through the body 142 of this valve device and the pipe bracket 4 and opens at its opposite end into the passageway 121 in the pipe bracket 4 intermediate the ends of this passageway 121.

Secured by any suitable means (not shown) to the body 142 of each of the check valve devices 10 and 11 is a cup-shaped member 147 which cooperates with the respective body 142 to form a chamber 148 that is connected to the corresponding chamber 144 by a bore 149 that has formed at its lower end an annular valve seat 150.

Disposed in the chamber 148 is a poppet type valve 151 that has a fluted stem disposed in the corresponding bore 149. Interposed between the cup-shaped member 147 and the valve 151 is a light spring 152 which is normally effective to bias the valve 151 into sealing contact with its seat 150 with such force as to require a pressure of, for example, two pounds per square inch in the chamber 144 to effect unseating thereof to open a communication between the chambers 144 and 148.

The cup-shaped member 147 is provided with a bore 153 and a coaxial counterbore 154 the lower end of which is screw threaded to receive a screw-threaded plug 155. Slidably mounted in the counterbore 154 is a piston 156 having a stem 157 that extends through the bore 153 and into the chamber 148. Interposed between the plug 155 and the piston 156 is a spring 158 of such strength that it is effective via the piston 156 and its stem 157 to normally assist the spring 152 in providing a total chosen force of, for example, fifteen pounds per square inch, acting on the valve 151 to press this valve against its seat 150.

Opening into the chamber 148 in the check valve device 10 is one end of a passageway 159 that extends through the body 142 of the valve device 10 and the pipe bracket 4 and opens at its opposite end into the passageway 121 in the pipe bracket 4 intermediate the ends of this passageway. Likewise, opening into the chamber 148 in the check valve device 11 is one end of a passageway 160 that extends through the body 142 of the valve device 11 and the pipe bracket 4 and opens at its opposite end into the passageway 119 in the pipe bracket 4 intermediate the ends of this passageway.

A chamber 161 below the piston 156 is constantly open to atmosphere via a passageway 162 extending through the cup-shaped member 147 to the exterior thereof.

The variable orifice type of feed valve device 12 is shown in FIG. 1A of the drawings and may be of the self-lapping type, such as that disclosed in United States Patent 3,275,027, issued Sept. 27, 1966 to Richard L. Wilson and assigned to the assignee of the present application, and, in view of this, it is deemed unnecessary to describe this device in detail. Briefly, however, the feed valve device 12 comprises a piston-operated tapered stem 163 reciprocably movable into or out of a bore 164 for varying the size of an orifice that connects a supply passageway 165, which is connected by a pipe bearing the same numeral to an independent source of fluid under pressure on the special utility car that, for example, may be a reservoir 166 that is charged by an air compressor (not shown), to a delivery passageway 167 that extends through the feed valve device 12, the pipe bracket 4, and the casing 15 (FIG. 1) of the hereinbefore-described cutoff relay valve device 5 and opens into the chamber 28 in this valve device. The insertion of the stem 163 (FIG. 1A) into the passageway 164 effects a decrease in the size of the orifice formed between the periphery of the stem 163 and the wall of the passageway 164, and the retraction of the stem effects an increase in the size of this orifice. A piston 168 that is integral with the stem 163 is subject on its lower side to fluid under pressure in the reservoir 166 to effect withdrawal of the stem from the orifice, and is subject on the other side to delivery pressure provided through a choke 169 to provide pressure on this other side to effect insertion of the stem 163 into the passageway 164.

The detector valve device 13 comprises a sectionalized casing containing a diaphragm 170 clamped about its periphery between two casing sections 171 and 172 secured to the top of the pipe bracket 4 by any suitable means (not shown) and defining with these casing sections on the respective opposite sides of the diaphragm 170 two chambers 173 and 174.

The inner periphery of the above-mentioned diaphragm 170 is clamped between an annular diaphragm follower plate 175 and a diaphragm follower 176 formed integral with a valve stem 177 intermediate the ends thereof by a nut 178 that has screw-threaded engagement with corresponding screw threads formed on the left-hand end of the valve stem 177 which stem is slidably mounted in a blind bore 179 provided in the casing section 172.

The valve stem 177 has two spaced-apart elongated peripheral annular grooves 180 and 181 formed thereon. Between the adjacent ends of these elongated peripheral annular grooves, and also adjacent the left-hand end of the groove 180 and the right-hand end of the groove 181, the valve stem 177 has a peripheral annular groove in each of which is disposed an O-ring 182 for forming a seal with the wall surface of the blind bore 179. The right-hand end of the blind bore 179 is connected to the chamber 174 via a first passageway 183, a volume chamber 184 and a second passageway 185 all of which are formed in the casing section 172. A branch passageway 183a opens at one end into the passageway 183 intermediate the ends thereof and at the other end at the wall surface of the blind bore 179 adjacent the right-hand end of the valve stem 177 while this valve stem occupies the position shown in FIG. 1A. Also opening at the wall surface of the blind bore 179 in parallel spaced-apart relation is one of three passageways 186, 187 and 188. The passageway 186 extends through the casing section 172 and the pipe bracket 4 to the hereinafter-described directional valve device 14. Likewise, the passageway 187 extends through the casing section 172 and the pipe bracket 4 and opens into the passageway 167 intermediate the ends thereof. The passageway 188 constitutes an exhaust passageway in that it extends through the casing section 172 to the exterior thereof and has disposed therein an exhaust choke 189.

Disposed in the chamber 174 and interposed between the casing section 172 and the diaphragm follower 176 is a spring 190 which is normally effective to bias the valve stem 177 and the diaphragm 170 to the position shown in FIG. 1A in which the diaphragm follower plate 175 abuts an annular serrated rib 191 that is formed integral with the casing section 171.

The casing section 171 is provided with a pair of parallel spaced-apart bores 192 and 193 the bore 192 being coaxial with the blind bore 179 in the casing section 172 and having a groove in the wall surface thereof adjacent its right-hand end for receiving a snap ring 194.

Slidably mounted in the bore 192 is a cup-shaped intercepting valve 195 between which and a cover member 196 is interposed a spring 197 for normally biasing the intercepting valve 195 against the snap ring 194. In this position of the intercepting valve 195 an elongated peripheral annular groove 198 thereon establishes a communication between the diametrically arranged ends of two passageways 199 and 200 opening at the wall surface of the bore 192. The passageway 199 extends through the casing section 172 and at its opposite end opens at the wall surface of a counterbore 201 provided in this casing section 172 coaxial with the bore 193 therein which bore at its left-hand end has an annular valve seat 202.

The outer end of the counterbore 201 is closed by a boss 203 that is integral with the cover member 196 and interposed between this boss 203 and a flat disc-type check valve 204 having a choke 205 therein a spring 206 for normally biasing the check valve 204 against its seat 202.

The above-mentioned passageway 200 extends through the casing sections 171 and 172 and opens at its opposite end into the chamber 174 in order that a part of the fluid under pressure released from either section of the train brake pipe by operation of the repeater relay valve device 6 (FIG. 1) in a manner hereinafter described in detail can flow to this chamber 174 via the passageway 65, a passageway 207 opening at one end into the passageway 65 and extending through the pipe bracket 4 and casing sections 172 and 171 (FIG. 1A) and opening at its opposite end at the wall surface of the counterbore 201, the interior of counterbore 201, passageway 199, groove 198 on the intercepting valve 195 so long as it occupies the position shown in FIG. 1A, and the passageway 200. It may be noted that some of the fluid under pressure supplied to the interior of the counterbore 201 flows therefrom to the chamber 173 at the left-hand side of the diaphragm 170 via the choke 205 and the bore 193 at a rate determined by the size of this choke 205.

The directional valve device 14 comprises a casing section 208 secured to the bottom of the pipe bracket 4 on the left-hand side of the by-pass check valve device 10 and a diaphragm 209 clamped about its periphery between the casing section 208 and a cover 210 and defining with the cover a control chamber 211. Opening into the control chamber 211 is one end of a passageway 212 that extends through the cover 210, casing section 208, pipe bracket 4 and the casing 75 (FIG. 1) of the selector valve device 7 and opens at its other end into the passageway 88 in the casing 75 at the left-hand side of the choke 89 disposed in this passageway. A branch passageway 212a (FIG. 1A) extends through the pipe bracket 4 and is connected by a pipe bearing the same numeral to a volume reservoir 213. A choke 214 carried by the pipe bracket 4 is disposed in the passageway 212 the size of which choke controls the rate of flow of fluid under pressure to the chamber 211 and the volume reservoir 213.

At the left-hand side of the diaphragm 209 is a spring chamber 215 into which opens one end of a passageway 216 that extends through the casing section 208, pipe bracket 4 and the casing 75 (FIG. 1) of the selector valve device 7 and opens at its other end into the passageway 90 in the casing 75 at the left-hand side of the choke 91 disposed in this passageway. A branch passageway 216a extends through the pipe bracket 4 and is connected by a pipe bearing the same numeral to a volume reservoir 217, the volume of which is the same as that of the reservoir 213. A choke 218 carried by the pipe bracket 4 is disposed in the passageway 216 the size of which choke is the same as that of the choke 214.

Contained in the chamber 215 is a diaphragm follower 219 which is held in operative contact with the diaphgram 209 by a spring 220 interposed between the follower 219 and an annular spring seat 221 that rests against a partition wall 222 of the chamber 215. Follower 219 has a stem 223 that extends through the spring seat 221 and a central opening in the partition wall 222.

A chamber 224 is formed in the casing section 208 at the side of the partition wall 222 opposite the chamber 215 and contains a valve 225 that is linked by means of a forked connection 226 to the left-hand end of follower stem 223, as viewed in FIG. 1A of the drawings. The valve 225 is adapted to make seating contact with a valve seat 227 on the right-hand end of a cylindrical valve member 228 which is slidably mounted in a bore 229 formed in a casing section 230 which is secured to the casing section 208 by any suitable means (not shown). The bore 229 in the casing section 230 extends from the chamber 224 to a chamber 231 formed in another casing section 232 secured to the casing section 230 by any suitable means (not shown).

The valve member 228 is provided with a through bore 233 and a coaxial counterbore that is encircled at its right-hand end by the valve seat 227. The left-hand end of the valve member 228 is provided with a conical or poppet type valve 234 which valve is arranged for cooperation with a valve seat 235, formed on the casing section 230 at the left-hand end of the bore 229, to control communication between chamber 231 and a chamber 236 formed by the wall of the bore 229 and a reduced portion of the valve member 228. A spring 237 disposed in the chamber 231 constantly urges the valve member 228 in the direction of the right-hand to a position in which communication between chambers 224 and 231 is opened via bore 233 and its coaxial counterbore, and communication between chamber 231 and chamber 236 is closed, as shown in FIG. 1A of the drawings.

The above-mentioned chamber 224 is connected by a passageway 238 extending through casing section 208 and pipe bracket 4 to the hereinbefore-mentioned passageway 212 on the upper side of the choke 214 as viewed in FIG. 1A of the drawings. The hereinbefore-mentioned passageway 186, one end of which opens at the wall surface of the blind bore 179 in the detector valve device 13 extends through the casing section 172 of this valve device, pipe bracket 4, and the casing sections 208, 230, and 232 of the directional valve device 14 to the chamber 231 therein. The chamber 236 is connected by a passageway 239 extending through the casing sections 230 and 208, and the pipe bracket 4 to the hereinbefore-mentioned passageway 216 in the pipe bracket 4 and opening thereinto on the upper side of the choke 218, as viewed in FIG. 1A of the drawings.

In the operation of the repeater apparatus now to be described in detail, it will first be assumed that the special car on which the repeater relay valve device 1 is installed is coupled into a train of cars substantially midway the length thereof; that the pipe 119 is connected by hose and hose couplings to that end of the portion 2 of the train brake pipe that is adjacent one end of the special car; that the pipe 121 is connected by hose and hose couplings to that end of the portion 3 of the train brake pipe that is adjacent the other end of the special car; that the reservoir 166 (FIG. 1A) is charged with fluid under pressure from a compressor (not shown); and that the variable orifice type of feed valve device 12 (FIG. 1A) is set to provide in the passageway 167 fluid at a chosen pressure which, for example, may be one-hundred pounds per square inch.

It will be further assumed that the brake pipe pressure in both portions 2 and 3 of the train brake pipe is zero, and that a fluid pressure supply such as for example, a yard charging plant is connected to that end of the portion 3 of the train brake pipe opposite the end of this portion 3 to which the pipe 121 is connected by the hose and hose couplings. Before fluid under pressure is supplied to the portion 3 of the train brake pipe, all parts of the repeater relay valve device 1 occupy the position shown in FIGS. 1 and 1A of the drawings. It will be particularly noted that the spring 42 (FIG. 1) is effective at this time to bias the diaphragm follower 19 and stem 22 to the position shown in FIG. 1 thereby maintaining valve 29 unseated from its seat 30. Therefore, fluid at the pressure determined by the setting of the feed valve device 12 will flow from the passageway 167 to the chamber 46 in the repeater relay valve device 6 via chamber 28, bore 27 and passageways 37 and 49.

The fluid under pressure supplied from the yard charging plant to the portion 3 of the train brake pipe will flow therefrom to the chamber 87 in the selector valve device 7 via pipe and passageway 121, right-hand end of bore 77, and passageway 90 and choke 91 disposed therein, whereupon diaphragm 84 and valve 93 are moved from the position shown in FIG. 1 in the direction of the left hand against the yielding resistance of spring 102 to a second position in which the chamber 86 is vented to atmosphere via passageway 88, choke 89, groove 108, passageway 122 and choke 123. This deflection of the diaphragm 84 is also effective via plunger 111 to unseat valve 112 from its seat 113.

It should be noted that since the combined force of the springs 152 and 158 presses the valve 151 in the check valve device 11 against its seat 150 with a force of, for example, fifteen pounds per square inch, as hereinbefore stated, the fluid under pressure supplied to the passageway 146 from the portion 3 of the train brake pipe upon the initial supply of fluid under pressure from the yard charging plant, will not unseat valve 151 to allow flow of fluid under pressure from the portion 3 of the train brake pipe to the portion 2 prior to the diaphragm 84 moving the positioning valve 93 to its second position.

In the above-mentioned position of the valve 93, some of the fluid under pressure supplied from the yard charging plant to the passageway 90 flows therefrom to the chamber 71 in the repeater relay valve device 6 via branch passageway 90a, groove 106 and passageway 72. Fluid under pressure also flows from passageway 72 to chamber 134 in the two-step check valve device 9 via branch passageway 72a. The value of spring 140 is such that when the pressure supplied to chamber 134 is increased to, for example, ten pounds per square inch, the piston 138 is moved upward against the yielding resistance of spring 140 thereby removing the force of spring 140 from the top of check valve 133. However, this is without effect at this time, it being understood that upon effecting an emergency brake application the venting of chamber 134 via the train brake pipe will cause spring 140 to reload check valve 133 to trap fluid at a chosen pressure in chamber 24 and the reservoir 131 thereby to maintain valve 29 seated on seat 30 to cut off flow from feed valve device 12 to supply chamber 46 in repeater relay valve device 6.

Fluid under pressure supplied to the chamber 71 in the repeater relay valve device 6 is effective to deflect diaphragm 57 in the direction of the right hand and move the stem 62 in the same direction to unseat valve 50 from seat 48 whereupon fluid under pressure will flow from the chamber 46 to the portion 2 of the train brake pipe via bore 45, chamber 64, passageways 67, 67a, chamber 79, passageway 120, counterbore 114, past unseated valve 112, chamber 115, passageway and pipe 119 and the hose and hose coupling connecting pipe 119 to the portion 2 of the train brake pipe. It should be noted that some of the fluid under pressure supplied to passageway 67 flows to chamber 25 in cut-off relay valve device 5. Also, fluid under pressure flows from passageway 67 to chamber 24 via branch passageway 67b, choke 126, past valve 128 and passageway 130, the choke 126 serving to restrict rate of charging chamber 24.

The repeater relay valve device 6 is of the self-lapping type and, therefore, will operate to effect charging of the portion 2 of the train brake pipe from the reservoir 166 (FIG. 1A) on the special utility car, which reservoir is connected to chamber 46 as hereinbefore described, in response to charging of the portion 3 of the train brake pipe from the yard charging plant. Upon the portion 3 of the train brake pipe becoming charged to the setting of the feed valve device associated with the yard charging plant, which setting is less than the setting of the usual feed valve provided on locomotives, the relay valve device 6 will lap off and prevent further flow of fluid under pressure from the reservoir 166 to the portion 2 of the train brake pipe.

Let it now be supposed that the yard charging plant is disconnected from the portion 3 of the train brake pipe, and subsequently a locomotive is coupled to the opposite end of the train at which time the brake pipe on the locomotive is connected to that end of the portion 2 of the train brake pipe opposite the end to which the pipe 119 is connected.

The engineer will now move the handle of the engineer's brake valve device on the locomotive to its release position whereupon fluid under pressure will flow from the main reservoir and the feed valve device on the locomotive to the portion 2 of the train brake pipe via the brake valve device, it being remembered as aforestated, that the setting of the feed valve device on the locomotive is higher than the setting of the feed valve device of the yard charging plant and lower than the setting of the feed valve device 12. Consequently, the pressure in the portion 2 of the train brake pipe will increase as the result of fluid under pressure supplied thereto from the main reservoir on the locomotive.

Fluid under pressure thus supplied to the portion 2 of the train brake pipe will flow therefrom to the chamber 56 in the relay valve device 6 (FIG. 1) via the hose and hose couplings, pipe and passageway 119, chamber 115, past unseated valve 112, counterbore 114, passageway 120, chamber 79, passageways 67a and 67, chamber 64, and passageways 55a and 55. When the pressure in chamber 56 is thus increased above the pressure in the chamber 71, the diaphragm 57 is deflected in the direction of the left hand to move the stem 62 and exhaust valve seat 60 thereon in the same direction away from their lap position it being understood that the valve 50 remains seated on supply valve seat 48 at this time.

When the exhaust valve seat 60 is moved away from the valve 50, fluid under pressure which is being supplied from the main reservoir on locomtive to the passageway 67 in the manner previously described will flow from the passageway 67 to atmosphere via chamber 64, bore 45, past valve seat 60, blind bore 61, crossbore 61a, chamber 63, passageway 65, and exhaust choke 66 at a rate controlled by the size of this choke 66.

Since the choke 66 restricts the rate of flow of fluid under pressure from the passageway 65 to atmosphere, some of the fluid under pressure that is flowing to the passageway 65 from the passageway 67 will flow from the passageway 65 to the interior of the counterbore 201 (FIG. 1A) in the detector valve device 13 via passageway 207.

Fluid under pressure thus supplied to the interior of the counterbore 201 flows therefrom to the chamber 174 at an unrestricted rate via passageway 199, groove 198 on intercepter valve 195, and passageway 200, and some of the fluid under pressure supplied to the interior of this counterbore 201 flows therefrom to the chamber 173 at a restricted rate via the choke 205 in check valve 204 and the bore 193.

When the pressure in the chamber 173 is increased to a chosen value depending on the strength of spring 197 which, for example, may be twenty-five pounds per square inch, it is effective to move the intercepting valve 195 in the direction of the left hand against the yielding resistance of the spring 197 to a position in which the elongated peripheral annular groove 198 on the valve 195 cuts off communication between passageways 199 and 200 to thereby prevent further flow of fluid under pressure to the chamber 174. Fluid under pressure will continue to flow from the interior of the counterbore 201 to the chamber 173 via the choke 205 and bore 193.

When the pressure in the chamber 173 has increased to a value slightly higher than said chosen value which higher value, for example, may be twenty-seven pounds per square inch, thereby providing a differential of pressure on the opposite sides of diaphragm 170 of two pounds per square inch, this diaphragm 170 will be deflected in the direction of the right hand against the yielding resistance of the spring 190 to move the valve stem 177 in the direction of the right hand from the position shown in FIG. 1A to a second position in which the elongated groove 180 on the stem 177 establishes a communication between the passageways 187 and 186. The passageway 187 is connected to the passageway 167 which is supplied with fluid under pressure by the feed valve device 12. Therefore, fluid under pressure will flow from the passageway 187 to the chamber 86 (FIG. 1) at the left-hand side of the diaphragm 84 of the selector device 7 via the groove 180 (FIG. 1A), passageway 186, chamber 231, bore 233 and its coaxial counterbore, chamber 224, passageways 238, 212 and 88. The choke 89 restricts the rate of flow of fluid under pressure from the passageway 88 to atmosphere via groove 108, passageway 122 and exhaust choke 123 thereby providing for the buildup of pressure in chamber 86.

In the second position of the valve stem 177, the groove 181 on this valve stem establishes a communication between branch passageway 183a and passageway 188 whereby fluid under pressure is vented from chamber 174 to atmosphere via passageway 185, volume chamber 184, passageway 183, branch passageway 183a, groove 181, passageway 188 and choke 189 at a rate determined by the size of the choke 189. Furthermore, the right-hand end of blind bore 179 is vented to atmosphere via passageway 183, branch passageway 183a, groove 181, passageway 188 and the choke 189.

As hereinbefore-stated, the feed valve device 12 provides in passageway 167 fluid at a pressure which, for example, may be one-hundred pounds per square inch, it being understood that this pressure is higher than that provided by the yard charging plant and supplied to the chamber 87 during initial charging of the brake pipe by the yard charging plant. Consequently, the fluid under pressure supplied to the passageway 88 and chamber 86 is at a higher pressure than that present in the chamber 87 and, therefore, is effective to deflect the diaphragm 84 in the direction of the right hand until diaphragm follower 92 contacts spring seat 97 after which further deflection is against the yielding resistance of the caged spring 98. This deflection of the diaphragm 84 in the direction of the right hand effects movement of the positioning valve 93 in the same direction to a third position in which the chamber 87 is open to atmosphere via passageway 90, choke 91, groove 108, passageway 122 and choke 123. As the valve 93 is thus moved in the direction of the right hand, the stem 110 at the right end of this valve is effective to unseat valve 82 from its seat 78, it being understood that as the valve 93 is thus moved the spring 118 is rendered effective to seat valve 112 on its seat 113 to close communication between passageways 119 and 120 to cut off flow from the brake valve device on the locomotive to chamber 56 in repeater relay valve device 6.

Upon the valve 93 reaching its right-hand position, the fluid under pressure supplied to the portion 2 of the train brake pipe by the brake valve device on the locomotive will flow at an unrestricted rate to the chamber 71 in the repeater relay valve device 6 via pipe and passageway 119, branch passageways 119a and 119b, groove 106 and passageway 72.

Fluid under pressure thus supplied to the chamber 71 together with the force of the light spring 74 is effective to deflect the diaphragm 57 in the direction of the right-hand to cause the repeater relay valve device 6 to effect the supply of fluid under pressure from the supply chamber 46 and reservoir 166 to the portion 3 of the train brake pipe via the bore 45, chamber 64, passageway 67, branch passageway 67a, chamber 79, past unseated valve 82, bore 77 and passageway and pipe 121, and to the chamber 56 via the bore 45, chamber 64, branch passageway 55a and passageway 55. Fluid under pressure will thus flow to the portion 3 of the train brake pipe and to the chamber 56 until the pressure in the chamber 56 is increased sufficiently to overcome the force of the light spring 74 and the fluid pressure force acting on the left-hand side of the diaphragm 57 at which time repeater relay valve device 6 is moved to its lap position in which the valve 50 is seated on the valve seats 48 and 60 to cut off further flow of fluid under pressure to the portion 3 of the train brake pipe and to the chamber 56. Thus the portion 3 of the train brake pipe is charged from the reservoir 166 on the special utility car to a pressure that is slightly higher (dependent on the strength of the light spring 74) than the pressure to which the portion 2 of the train brake pipe is charged by the brake valve device on the locomotive.

From the foregoing, it is apparent that if a train is charged by connecting a yard charging plant to one end of the train brake pipe and subsequently connecting the brake pipe on the locomotive to the other end of the train brake pipe to complete the charging of the train brake pipe to a pressure higher than the pressure to which the brake pipe was charged by the yard charging plant, the positioning valve 93 is first moved to a second position to correspond to the one end of the train brake pipe to which the yard charging plant is connected, and is then automatically moved to a third position to correspond to the other end of the train brake pipe to which the locomotive is subsequently coupled to further charge the brake pipe to the normal fully charged train brake pipe pressure. This shifting of the positioning valve 93 from its second position to its third position renders the repeater relay valve device 6 operative in response to the charging of that portion of the train brake pipe extending from the locomotive to the special utility car to effect corresponding charging of the remaining portion of the train brake pipe extending from the special utility car to that end of the train opposite the end to which the locomotive is coupled.

Oftimes when charging a train in a yard from the yard charging plant, the train is charged in sections, that is several sections, each consisting of a plurality of cars, are charged separately from the yard charging plant, after which the several sections are coupled together to form a train. Furthermore, quite often there is excessive train brake pipe leakage so that when a locomotive is coupled to the train made up of the several sections previously charged to the setting of the feed valve device of the yard charging plant, which, as hereinbefore stated, may be sixty pounds per square inch, the pressure in the train brake pipe on those cars in the train that are remote from the locomotive cannot be increased to the setting of the feed valve device on the locomotive, which as hereinbefore stated, may be seventy pounds per square inch. In case of severe train brake pipe leakage, the pressure in the brake pipe on these remote cars in the train can only be increased one or two pounds per square inch above the sixty pounds per square inch to which the brake pipe on these cars was charged by the yard charging plant prior to coupling the locomotive to the train. Accordingly, assuming that the positioning valve 93 of the selector valve device 7 has been positioned in accordance with the end of the brake pipe on the special car to which the yard charging fluid pressure was supplied, and that the locomotive is subsequently connected to effect charging of the train brake pipe via the opposite end of the brake pipe on the special car, the train brake pipe pressure will not be increased sufficiently, because of the severe brake pressure leakage, to cause shifting of the positioning valve 93 to the proper position corresponding to that in accordance with the end of the brake pipe from which charging from the locomotive is being finally accomplished.

It is customary practice to effect a full service brake application subsequent to coupling a locomotive to a train and prior to the train leaving a terminal. Accordingly, if the positioning valve 93 of the selector valve device 7 on the special car is incorrectly positioned at the time this full service brake application is effected, this valve 93 will be correctly positioned when the above-mentioned full service brake application is released and the train brake pipe recharged in a manner now to be explained in detail.

In order to release the above-mentioned full service brake application, the engineer will move the handle of the engineer's brake valve device on the locomotive to its release position whereupon fluid under pressure will flow from the main reservoir and the feed valve device on the locomotive to the portion 2 of the train brake pipe and thence to pipe 119 on the special utility car via the engineer's brake valve device, it being assumed that the locomotive is connected to that end of this portion 2 of the train brake pipe opposite the end to which the pipe 119 is connected. Consequently, the pressure in the portion 2 of the brake pipe will increase as the result of fluid under pressure supplied thereto from the main reservoir on the locomotive.

Fluid under pressure thus supplied to the portion 2 of the train brake pipe will flow therefrom to the chamber 56 in the relay valve device 6 (FIG. 1) via pipe and passageway 119, chamber 115, past unseated valve 112 (it being understood that the positioning valve 93 now occupies its left-hand position), counter bore 114, passageway 120, chamber 79, passageways 67a and 67, chamber 64 and passageways 55a and 55. When the pressure in chamber 56 is thus increased above the pressure in the chamber 71, the repeater relay valve device 6 operates in the manner hereinbefore described in detail to bent the fluid under pressure supplied to the passageway 67 from the main reservoir on the locomotive to atmosphere via the passageway 65 and the exhaust choke 66.

Since the choke 66 restricts the rate of flow of fluid under pressure from the passageway 65 to atmosphere, some of the fluid under pressure that is flowing to the passageway 65 from the passageway 67 will flow to the detector valve device 13 via the passageway 207 to cause this valve device 13 to operate in the manner hereinbefore described in detail to effect the supply of fluid under pressure from the feed valve device 12 (FIG. 1A) to the chamber 86 (FIG. 1) it being understood that the feed valve device 12 provides fluid at a pressure of one-hundred pounds per square inch, as hereinbefore stated. Since this pressure is higher than that present in the chamber 87 and previously supplied to this chamber from the yard charging plant, the diaphragm 84 will be deflected in the direction of the right hand to thereby effect movement of the positioning valve 93 in the same direction to its right-hand or correct position.

Upon the positioning valve 93 reaching its right-hand position, fluid under pressure supplied to the portion 2 of the train brake pipe by the brake valve device on the locomotive will flow at an unrestricted rate to the chamber 71 via the pathway hereinbefore described.

Fluid under pressure thus supplied to the chamber 71 causes the repeater relay valve device 6 to operate in the manner hereinbefore described to effect the supply of fluid under pressure to the portion 3 of the train brake pipe and to the chamber 56 in valve device 6 until this valve device is moved to its lapped position in the manner hereinbefore described to cut off flow of fluid under pressure to the portion 3 of the train brake pipe and to the chamber 56. Thus the portion 3 of the train brake pipe extending through those cars in the train that are coupled to that end of the special utility car opposite the end to which is coupled the train brake pipe extending from the special utility car to the locomotive, is charged from the reservoir 166 on the special utility car to a pressure that is slightly higher (dependent on the strength of spring 74) than the pressure to which the portion 2 of the train brake pipe is charged by the brake valve device on the locomotive.

From the foregoing, it is apparent that if each section of a train, one section of which includes a special utility car having a positioning valve 93, is charged by successively connecting a yard charging plant to each of the multi-car sections, the positioning valve 93 will be positioned in accordance with that end of the section including the special utility car to which the yard charging plant is connected. Furthermore, it is apparent that the present invention insures that if a locomotive is subsequently coupled to that end of the assembled train so that the positioning valve 93 is incorrectly positioned with respect to that end of the train to which the locomotive is coupled, this positioning valve will be automatically correctly repositioned when a brake release is made subsequent to effecting the full service application always effected prior to the train leaving a terminal notwithstanding excessive train brake pipe leakage which is sufficient to prevent proper repositioning of the improperly positioned positioning valve 93 on the special utility car at the time the locomotive is coupled to the train.

It may be noted that if the yard charging plant is connecting to that end of the portion 2 of the train brake pipe opposite the end of this portion 2 to which the pipe 119 is connected by the hose and hose coupling rather than to that end of the portion 3 of the train brake pipe opposite the end of this portion 3 to which the pipe 121 is connected, the directional valve device 14 will be operated to close the communication between the passageways 186 and 238 and open a communication between the passageway 186 and the passageway 239 to provide for the flow of fluid under pressure from the passageway 186 to the chamber 87 in the selector valve device 7 upon operation of the detector valve device 13 in the manner hereinbefore described.

Therefore, let it be supposed that the yard charging plant is connected to that end of the portion 2 of the train brake pipe opposite the end that is connected to the pipe 119.

Let it also be supposed that positioning valve 93 occupies the position shown in FIG. 1.

The fluid under pressure supplied from the yard charging plant to the portion 2 of the train brake pipe will flow therefrom to the chamber 86 in the selector valve device 7 via pipe and passageway 119, branch passageway 119a, groove 107, passageway 88 and choke 89 therein, whereupon diaphragm 84 is deflected in the direction of the right hand to move the valve 93 in the same direction to its hereinbefore-mentioned third position. Some of the fluid under pressure supplied to the passageway 88 flows therefrom to the chamber 211 in the directional valve device 14 via passageway 212 and choke 214 therein, it being noted that some of this fluid flows to the volume reservoir 213 via branch passageway 212a. When the pressure in the reservoir 213 and chamber 211 is thus increased sufficiently to overcome the force of spring 220, the diaphragm 209 will be deflected in the direction of the left hand to move the stem 223 in the same direction to first effect seating of the valve 225 on its seat 227 and thereafter move the valve member 228 in the direction of the left hand to effect unseating of the valve 234 from its seat 235. When the valve 225 is thus seated on its seat 227, ocmmunication is closed between passageways 186 and 238, and when valve 234 is thus unseated from its seat 235, a communication is established between the passageways 186 and 239.

Therefore, when the detector valve device 13 is operated in the manner hereinbefore-described, fluid under pressure will be supplied from the feed valve device 12 to the passageway 239 and thence to chamber 87 in the selector valve device 7 via passageways 216 and 90. Since the fluid supplied to the chamber 87 from the feed valve device 12 is at a higher pressure than that previously supplied from the yard charging plant to the chamber 86, the diaphragm 84 will be deflected in the direction of the left hand to move the positioning valve 93 to its hereinbefore second position thereby correctly positioning this valve so that the repeater relay valve device 6 will operate in response to the supply of fluid under pressure thereto from the engineer's brake valve device on the locomotive to effect the supply of fluid under pressure from the reservoir 166 on the special utility car to that portion of the train brake pipe extending from the special utility car to the back end of the last car in the train.

Let it now be supposed that the entire train is charged and that while traveling along a railway track, the engineer desires to effect a service brake application. Also, let it be supposed that the locomotive is coupled to that end of the portion 2 of the train brake pipe opposite the end to which the pipe 119 is connected and that the positioning valve 93 of the selector valve device 7 is correctly positioned in its third or right-hand position.

To effect a service brake application, the engineer will move the handle of the brake valve device to a position in its application zone in accordance with the degree of brake application desired.

When the handle of the brake valve device is thus moved into its application zone, fluid under pressure will be vented from the portion 2 of the train brake pipe to atmosphere until the pressure therein is reduced to a degree corresponding to the position the handle of the brake valve device occupies in its application zone.

Since it has been assumed that the positioning valve 93 occupies its third or right-hand position, the groove 106 on the valve 93 establishes a communication between passageway 72 and branch passageway 119b. Therefore, fluid under pressure will now flow from the chamber 71 in the repeater relay valve device 6 to atmosphere via passageway 72, groove 106, branch passageway 119b and 119a, passageway and pipe 119, portion 2 of the train brake pipe and the brake valve device on the locomotive until the pressure in the chamber 71 is likewise reduced to the degree corresponding to the position the handle of the brake valve device occupies in its application zone.

As the pressure in the chamber 71 is thus reduced, the pressure in the chamber 56 is rendered effective to deflect the diaphragm 57 in the direction of the left hand to move the valve stem 62 in the same direction. As the stem 62 is thus moved in the direction of the left hand, the exhaust valve seat 60 is moved away from the valve 50 which remains seated on the supply valve seat 48. Upon movement of the exhaust valve seat 60 away from the valve 50, fluid under pressure will flow from the portion 3 of the train brake to atmosphere via pipe and passageway 121, right-hand end of bore 77, past now unseated valve 82, chamber 79, branch passageway 67a, passageway 67, chamber 64, bore 45, blind bore 61, crossbore 61a, chamber 63, passageway 65 and choke 66 the size of which provides for releasing fluid under pressure from the portion 3 of the train brake pipe extending through those cars in the train between the special utility car and the back end of the last car in the train at a service rate. Likewise, fluid under pressure will flow from the chamber 56 at the right-hand side of the diaphragm 57 to atmosphere via passageway 55, branch passageway 55a, chamber 64, bore 45, blind bore 61, crossbore 61a, chamber 63, passageway 65 and choke 66.

Fluid under pressure will now flow from the portion 3 of the train brake pipe and the chamber 56 until the pressure therein is reduced to substantially that in the chamber 71 and the portion 2 of the train brake pipe, whereupon the repeater relay valve device 6 moves to its lap position to cut off flow from the portion 3 of the train brake pipe and the chamber 56 to atmosphere. Accordingly, it will be understood from the foregoing that the repeater relay valve device 6 operates in response to a reduction in the pressure in the train brake pipe extending from the locomotive to the special utility car to effect a corresponding reduction in the pressure in the train brake pipe extending from the special utility car to the back end of the last car in the train.

When the pressure is reduced in one section of the train brake pipe at an emergency rate, one or the other of the by-pass check valve devices 10 and 11 operates to cause a corresponding emergency rate of reduction in the pressure in the other section of the train brake pipe. Since the by-pass check valve devices 10 and 11 are identical in construction and operation, a description of the operation of one will suffice for both.

Let is be assumed that while both sections of the train brake pipe are fully charged to the normal brake pipe pressure, the pressure in the portion 3 of the train brake pipe is reduced to zero at an emergency rate as the result of, for example, a ruptured hose. As the pressure in the portion 3 of the train brake pipe is reduced at an emergency rate, the pressure in the pipe and passageway 121, the passageway 159 and the chamber 148 in the by-pass check valve device 10 is likewise reduced at an emergency rate until the pressure therein is zero or atmospheric pressure. As the pressure in the chamber 148 is thus reduced to zero, the force acting to press the valve 151 of the by-pass check valve device 10 against its corresponding seat 150 is reduced to the force resulting from the two springs 152 and 158, it being understood that these are light springs such that this force may be, for example, fifteen pounds per square inch, as hereinbefore stated.

Therefore, as the pressure in the chamber 148 is reduced to zero at an emergency rate, the pressure in the chamber 144 will unseat the valve 151 against the yielding resistance of the two light springs 152 and 158 from its seat 150. Upon unseating of the valve 151, fluid under pressure in the portion 2 of the train brake pipe will flow therefrom to the chamber 148 via pipe and passageway 119, passageway 145, chamber 144, and bore 149. Since the chamber 148 is open to atmosphere via passageway 159, passageway and pipe 121 and the ruptured hose in the portion 3 of the train brake pipe, it will be apparent that fluid under pressure in the portion 2 of the train brake pipe likewise will be vented to atmosphere at an emergency rate simultaneously with that in the portion 3. Accordingly, an emergency brake application will be effected on all the cars in the train independently of the repeater relay valve device 6 and the selector valve device 7.

While the positioning valve 93 of the selector valve device 7 occupies its left-hand position, the groove 106 on the valve 93 connects the passageway 72 to the portion 3 of the train brake pipe via branch passageway 90a, passageway 90 and choke 91 therein, bore 77, pipe and passageway 121 and the hose and hose couplings connecting pipe 121 to the portion 3. While the positioning valve 93 occupies its right-hand position, the groove 106 on the valve 93 connects the passageway 72 to the portion 2 of the train brake pipe via branch passageways 119b and 119a, passageway and pipe 119 and the hose and hose couplings connecting pipe 119 to the portion 3.

The chamber 134 in the two-step check valve device 9 is connected to the passageway 72 by the branch passageway 72a. Therefore, whenever an emergency brake application is effected, fluid under pressure in the chamber 134 will be vented to atmosphere at an emergency rate until the pressure in the chamber 134 is reduced to zero or atmospheric pressure.

The strength of the spring 140 may be such as to, for example, move the piston 138 and stem 139 downward to cause the valve 133 to seat on its seat 132a when the pressure in the chamber 134 has been reduced to fifteen pounds per square inch. Consequently, it will be apparent that when the valve 133 is seated on its seat 132a, a pressure of, for example, fifteen pounds per square inch is retained or trapped in the chamber 24 of the cut-off relay valve device 5 and the volume reservoir 131.

If the positioning valve 93 occupies its right-hand position at the time an emergency brake application is effected as the result of, for example, a ruptured hose, fluid under pressure present in the chamber 25 below the diaphragm 16 of the cut-off valve device 5 flows to the passageway 121 via passageway 67, branch passageway 67a, chamber 79, past now unseated valve 82 and bore 77 and thence to atmosphere via pipe 121 and the rupture in the portion 3 of the train brake pipe, or to atmosphere via passageway 146, chamber 144, bore 149, past valve 150 and chamber 148 of the by-pass check valve device 11, passageway 160, passageway and pipe 119 and the ruptured hose in the portion 2 of the train brake pipe if the rupture has occurred in this portion 2 rather than the portion 3 of the train brake pipe.

As the pressure in the chamber 25 is thus reduced to zero, the retained pressure in the chamber 24 is rendered effective to deflect diaphragm 16 downward to move the stem 22 in the same direction. This downward movement of the stem 22 renders the spring 38 effective via the piston 33 and pin 34 to seat valve 29 on its seat 30. The seating of valve 29 on seat 30 cuts off the passageway 167, which is connected to the feed valve device 12, from the passageway 37 that is connected to the supply valve chamber 46 in the repeater relay valve device 6 via passageway 49.

The purpose of cutting off the feed valve device 12 from the chamber 46 in the valve device 6 is to prevent the waste of fluid under pressure when an emergency brake application is effected, this fact being made apparent from the following description of operation of the repeater relay valve device 6.

Assume first that the positioning valve 93 of the selector valve device 7 occupies its right-hand position. Therefore, if a hose in the portion 2 of the train brake pipe is ruptured, fluid under pressure will flow from the chamber 56 in the repeater relay valve device 6 to atmosphere via passageway 55, branch passageway 55a, chamber 64, passageway 67, branch passageway 67a, chamber 79, past now unseated valve 82, bore 77, passageways 121 and 146, chamber 144, bore 149, past unseated valve 151 and chamber 148 in by-pass check valve device 11, passageway 160, passageway and pipe 119 and the portion 2 of the train brake pipe to the ruptured hose therein. If a hose in the portion 3 of the train brake pipe had ruptured, fluid under pressure would have been vented from the passageway 121 to atmosphere via pipe 121 and the portion 3 of the train brake pipe to the ruptured hose therein.

This venting of fluid under pressure from the chamber 56 to atmosphere would cause the diaphragm 57 to effect unseating of the valve 50 from supply valve seat 48. Were the valve 29 not now seated on its seat 30 to cut off the supply of fluid under pressure to chamber 46, fluid under pressure would at this time flow from chamber 46 to atmosphere via bore 45, chamber 64, passageway 67, and one or the other of the pathways described above depending upon in which portion of the train brake pipe the rupture of the hose occurred.

Assume now that the positioning valve 93 occupies its left-hand position. In this position of the positioning valve 93, the check valve 82 is seated on its seat 78 and the check valve 112 is unseated from its seat 113. Therefore, fluid under pressure vented from the chamber 56 to the chamber 79 via the pathway described above will flow from the chamber 79 to the passageway 119 via passageway 120, counterbore 114, past now unseated valve 112, and chamber 115. If a rupture of a hose in the portion 2 of the train brake pipe has occurred, fluid under pressure will now flow from the passageway 119 to atmosphere via the pipe 119 and that part of the portion 2 of the train brake pipe extending from the pipe 119 to the point of rupture. On the other hand, if a rupture of a hose in the portion 3 of the train brake pipe was occurred, fluid under pressure will now flow from the passageway 119 to atmosphere via passageway 145, chamber 144, bore 149, past unseated valve 151, chamber 148, and passageway 159 in the by-pass check valve device 10, passageway and pipe 121, and that part of the portion 3 of the train brake pipe extending from the pipe 121 to the point of rupture.

It is thus apparent that the seating of the valve 29 on its seat 30 to cut off flow to the chamber 46 prevents an unnecessary waste of air upon the occurrence of a ruptured hose in either the portion 2 or the portion 3 of the train brake pipe.

If a service brake application is effected from the back end of a train as by, for example, moving the handle of a caboose valve device to its service position, the cut-off relay valve device 5 will operate in a manner now to be described to effect seating of the valve 29 on its seat 30 to close communication between the feed valve device 12 and the chamber 46 in the repeater relay valve 6 to prevent an unnecessary loss of fluid under pressure.

Let it be supposed that: (1) a locomotive is coupled to that end of the portion 2 of the train brake pipe opposite the end to which the pipe 119 is connected, (2) that the positioning valve 93 of the selector valve device 7 is correctly positioned in its third or right-hand position, and (3) that while the entire train brake pipe is charged and the train is traveling along a track, the handle of the caboose valve device on the caboose, which is the last car in the train, is moved to its service position to thereby cause venting to atmosphere of fluid under pressure at a service rate from the portion 3 of the train brake pipe extending from the caboose to the special utility car on which is located the repeater relay valve device 1.

As fluid under pressure thus flows from the portion 3 of the train brake pipe to atmosphere via the caboose valve device, fluid under pressure will flow from the chamber 56 in the repeater relay valve device 6 to the portion 3 via passageway 55, branch passageway 55a, chamber 64, passageway 67, branch passageway 67a, chamber 79, past now unseated valve 82 (since valve 93 occupies its right-hand position), bore 77, and passageway and pipe 121. This reduction in pressure in the chamber 56 effects operation of the valve device 6 in the manner hereinbefore-described to cause unseating of valve 50 from supply valve seat 48. If the valve 29 were not seated on its seat 30 in a manner now to be described, the above-mentioned unseating of the valve 50 would cause flow of fluid under pressure from the feed valve device 12 and the chamber 46 to atmosphere via bore 45, chamber 64, passageway 67, branch passageway 67a, chamber 79, past unseated valve 82, bore 77 passageway and pipe 121, portion 3 of the train brake pipe and the caboose valve device on the last car in the train.

Since one end of the passageway 67 opens into the chamber 25 in the cut-off valve device 6, it will be apparent the fluid under pressure will flow from this chamber to atmosphere simultaneously as fluid under pressure flows from the chamber 56 in the repeater relay valve device 6 to atmosphere in the manner described above. Consequently, as the pressure in the chamber 25 is thus reduced, the pressure in the chamber 24 is rendered effective to deflect the diaphragm 16 downward to effect movement of the stem 22 in the same direction. As the stem 22 is thus moved downward, the spring 38 acting via the piston 33 and pin 34 moves the valve 29 downward into contact with its seat 30 to cut off the feed valve device 12 from the chamber 46 in the repeater relay valve device 6 to thereby prevent unnecessary loss of fluid under pressure upon unseating of the valve 50 from the seat 48 in response to movement of the handle of the caboose valve device to its service position.

Having now described the invention, what I claim as new and desire to secure by Letters Patent, is:

1. In a fluid pressure brake control apparatus, carried by a special railway car provided with an independent source of fluid pressure and located intermediate the ends of a train, for duplicating in the portion of the train brake pipe connected to one end of the special car pressure changes effected in the portion of the train brake pipe connected to the opposite end of the special car, which apparatus includes:
    (a) selector valve means having an operating abutment adapted to be subject alternatively on opposite sides to the fluid pressure in the portion of the train brake pipe connected to said one end of the special car and to the fluid pressure in the portion of the train brake pipe connected to said opposite end of the special car, and responsive to a preponderance of the fluid pressure on one side corresponding to that in the train brake pipe connected to said one end of the special car to be operated from a neutral position to a first position at one side of the neutral position and to a preponderance of fluid pressure on the other side corresponding to that in the train brake pipe connected to the opposite end of the special car to be operated to a second position on the opposite side of said neutral position;
    (b) relay valve means responsive at one time to a control pressure corresponding to that established in the portion of the train brake pipe connected to said one end of the special car or at another time to a control pressure corresponding to that established in the portion of the train brake pipe connected to the opposite end of said special car depending upon whether said selector valve means is positioned in its said first position or its said second position respectively, said relay valve means being operative upon an increase in its control pressure to effect supply of fluid under pressure from the independent source to the opposite portion of the train brake pipe to a corresponding degree and upon a reduction of its control pressure to effect a corresponding reduction of the pressure in the opposite portion of the train brake pipe, said relay valve means being further operative upon an increase in fluid pressure in the said opposite portion of said train brake pipe over the pressure in the portion of the train brake pipe providing the control pressure for said relay valve means to vent fluid under pressure from the said opposite portion of the train brake pipe at a controlled rate, the combination therewith of means responsive to pressure build-up above a chosen pressure in a chamber of fluid under pressure vented by said relay valve means from said opposite portion of the train brake pipe for effecting a reversal of the position of the said selector valve means.

2. In a fluid pressure brake control apparatus carried by a special railway car provided with an independent source of fluid pressure and located intermediate the ends of a train for duplicating in the portion of the train brake pipe connected to one end of the special car pressure changes effected in the portion of the train brake pipe connected to the opposite end of the special car, which apparatus includes:
    (a) selector valve means having an operating abutment adapted to be subject alternatively on opposite sides of the fluid pressure in the portion of the train brake pipe connected to said one end of the special car and to the fluid pressure in the portion of the train brake pipe connected to said opposite end of the special car, and responsive to a preponderance of the fluid pressure on one side corresponding to that in the train brake pipe connected to said one end of the special car to be operated from a neutral position to a first position at one side of the neutral position and to a preponderance of fluid pressure on the other side corresponding to that in the train brake pipe connected to the opposite end of the special car to be operated to a second position on the opposite side of said neutral position;
    (b) relay valve means responsive at one time to a control pressure corresponding to that established in the portion of the train brake pipe connected to said one end of the special car or at another time to a control pressure corresponding to that established in the portion of the train brake pipe connected to the opposite end of said special care depending upon whether said selector valve means is positioned in its said first position or its said second position respectively, said relay valve means being operative upon an increase in its control pressure to effect supply of fluid under pressure from the independent source to the opposite portion of the train brake pipe to a corresponding degree and upon a reduction of the control pressure to effect a corresponding reduction of the pressure in the opposite portion of the train brake pipe, said relay valve means being further operative upon an increase in fluid pressure in the said opposite portion of said train brake pipe over the pressure in the portion of the train brake pipe providing the control pressure for said relay valve means to vent fluid under pressure from the said opposite portion of the train brake pipe at a controlled rate, the combination therewith of means responsive to pressure buildup in a chamber of fluid under pressure vented by said relay valve means from said opposite portion of the train brake pipe above a chosen pressure for effecting the supply of fluid pressure from said independent source to one side of the operating abutment of said selector valve means in a manner to cause reversal of the position of the said selector valve means from its said first position to its said second position or from said second position to said first position.

3. Apparatus, as claimed in claim 2, wherein said relay valve means is operative to vent fluid under pressure from said opposite portion of the train brake pipe to a communication leading to said chamber, further characterized by choke means via which fluid under pressure is released to atmosphere from said communication at a sufficiently restricted rate to enable build-up of fluid pressure in said chamber.

4. Apparatus, as claimed in claim 1, further characterized in that said means responsive to build-up in a chamber of fluid under pressure vented by said relay valve means from said opposite portion of the train brake pipe to above a chosen pressure comprises,
  (a) a detector valve device having:
    (i) valve means operative to effect the supply of fluid under pressure from the independent source of fluid under pressure to one or the other of the sides of the operating abutment of said selector valve means, and
    (ii) an abutment, operatively connected to said valve means for effecting the operation thereof, to the opposite sides of which abutment fluid under pressure vented by said relay valve means is supplied concurrently, said valve means being operative by said connected abutment upon the build-up of fluid pressure on one side of said abutment exceeding a certain chosen pressure build-up on the other side of said abutment, and
  (b) a directional valve means operated to one or the other of two positions in accordance with the particular control pressure effective to operate said relay valve means, said directional valve means selectively establishing in said one and in said other positions thereof different communications via which said detector valve device supplies fluid under pressure to that one of the sides of the abutment of said selector valve means to effect shifting of said selector valve means to its said second position if in its first position or to its said first position if in its said second position.

5. Apparatus, as claimed in claim 4, further characterized in that said detector valve device comprises:
  (a) means providing a communication via which fluid under pressure flows to one side of said abutment of said detector valve device at a restricted rate,
  (b) means providing a communication via which fluid under pressure flows to the other side of the aforesaid abutment at an unrestricted rate, and
  (c) limiting valve means controlling the communication via which fluid flows at an unrestricted rate to the other side of said abutment and operable to cut off flow to said other side upon the pressure on said one side of said abutment reaching said certain chosen pressure, whereby subsequently established predominating pressure acting on said one side of said abutment causes said abutment to operate said valve means to cause flow of fluid under pressure from the independent source of fluid under pressure to one or the other side of the operating abutment of said selector valve means.

6. Apparatus, as claimed in claim 5, further characterized in that means providing the communication via which fluid flows at a restricted rate to said one side of said abutment of said detector valve device comprises a check valve having a choke via which fluid flows at a restricted rate to said one side of the aforesaid abutment while said check valve is seated, said check valve when unseated permitting reverse flow of fluid under pressure from said one side at an unrestricted rate.

7. Apparatus, as claimed in claim 5, further characterized in that said limiting valve means comprises:
  (a) a valve member in one position establishing the communication via which fluid flows at an unrestricted rate to the other side of said abutment of said detector valve device and movable to another position in which said communication is closed, and
  (b) means biasing said valve member to its said one position,
  (c) said biasing means opposing movement of said valve member from its said one position to its said other position until the pressure on said one side of said abutment exceeds said certain chosen pressure.

8. Apparatus, as claimed in claim 5, further characterized in that said limiting valve maens comprises:
  (a) a stop,
  (b) valve means controlling flow of fluid under pressure to said other side of said abutment,
  (c) fluid pressure responsive means operatively connected to asid valve means for effecting movement of said valve means, and
  (d) biasing means for normally biasing said fluid pressure responsive means to a first position in abutting relation to said stop in which first position said valve means establishes said communication via which fluid under pressure flows to said other side of said abutment at said unrestricted rate,
  (e) said fluid pressure responsive means being operative against the yielding resistance of said biasing means upon the establishment of said certain chosen pressure on said one side of said abutment, to shift said valve means from its said first position to a second position in which said communication via which fluid under pressure flows to said other side of said abutment is closed.

9. Apparatus, as claimed in claim 4, further characterized in that said limiting valve means comprises:
  (a) a stop,
  (b) a piston valve member, one end of which is subject to the pressure on the one side of said abutment, said valve member having intermediate its ends an elongated peripheral annular groove, and
  (c) biasing means for normally biasing said valve member against said stop in which position said elongated annular groove establishes a communication through which fluid under pressure flows to said other side of said abutment,
  (d) said valve member being movable away from said stop against the yielding resistance of said biasing means to close said communication upon the pressure on said one side of said abutment exceeding a certain chosen pressure determined by said biasing means.

10. Apparatus, as claimed in claim 4, further characterized in that said directional valve means comprises:
  (a) two-position valve means,
  (b) an abutment operatively connected to said two-position valve means for effecting operation thereof to one or the other of its two positions accordingly as fluid under pressure is supplied to one or the other of the respective opposite sides of said abutment from one or the other portions of said train brake pipe, and
  (c) volume means open respectively to the respective opposite sides of said abutment to delay build-up of pressure on the corresponding side to insure that the operation of said two-position valve means from one of its positions to the other of its positions, in response to subsequently increasing the pressure in one portion of said train brake pipe substantially higher than the initial build-up of pressure in the other portion of said train brake pipe, occurs only after said selector valve means has been shifted either from its first position to its second position or from its second position to its first position in response to said subsequent increase in the pressure in said one portion of said train brake pipe, thereby insuring prior shifting of said selector valve means.

11. Apparatus, as claimed in claim 4, wherein said relay valve means is operative to vent fluid under pressure from said opposite portion of the train brake pipe to a communication leading to said chamber which communication is open to atmosphere via a restricted choke means, further characterized by said detector valve means having:
  (a) means for releasing fluid under pressure from said other side of said abutment of said detector valve device to atmosphere upon operation of said valve means to effect flow of fluid under pressure from the independent source of fluid under pressure to said one or the other sides of the operating abutment of said selector valve means whereby said valve means maintains said flow of fluid under pressure so long as said relay valve means is operative to release fluid under pressure from either portion of said train brake pipe to said one side of said abutment of said detector valve device, and (b) biasing means disposed on the other side of said abutment of said detector valve device and effective to cause said abutment to shift said valve means to terminate flow of fluid under pressure from said independent source of fluid under pressure in a chosen length of time, determined by the size of said choke means, subsequent to cessation of operation of said relay valve device to release fluid under pressure from a portion of said train brake pipe.

12. Apparatus, as claimed in claim 1, further characterized in that said selector valve means is effective upon reversal of its position, to establish communication via which to provide a control pressure for said relay valve means coresponding to that in the appropriate portion of the train brake pipe.

13. In a fluid pressure brake control apparatus, carried by a special railway car provided with an independent source cf fluid pressure and located intermediate the ends of a train, for duplicating in the portion of train brake pipe connected to one end of the special car pressure changes effected in the portion of the train brake pipe connected to the opposite end of the special car, which apparatus comprises:

(a) a self-lapping relay valve means comprising:
  (i) a movable abutment having a control chamber on one side thereof and a balancing chamber on the other side,
  (ii) a control communication opening at one end into said control chamber,
  (iii) a delivery communication opening at one end into said balancing chamber,
  (iv) a valve mechanism operably connected to said movable abutment and operative thereby to control the supply of fluid under pressure from the independent source of fluid pressure to said delivery communication and said balancing chamber and the release of fluid under pressure from said delivery communication and said balancing chamber respectively.

(b) three-position selector valve means
  (i) operable in response to the supply of fluid under pressure to the portion of the train brake pipe connected to said opposite end of the special car from a neutral position to a first position at one side of the neutral position in which first position said selector valve means establishes a first communication between the portion of the train brake pipe connected to said opposite end of the special car and the opposite end of said control communication of said relay valve means whereby fluid under pressure flows from said portion of the train brake pipe to said control chamber, and a second communication between the portion of the train brake pipe connected to the one end of the special car and the opposite end of said delivery communication of said relay valve means whereby (1) upon operation of said valve mechanism of said relay valve means in response to said flow of fluid under pressure to said control chamber, fluid under pressure flows from the independent source of fluid under pressure to said portion of the train brake pipe connected to the one end of the special car via said delivery communication and said second communication in series and to said balancing chamber to establish therein a pressure corresponding to the pressure in said portion of the train brake pipe connected to said opposite side of the special car, or (2) upon the supply of fluid under pressure to the portion of the train brake pipe connected to the one end of the special car, to cause operation of said relay valve means to effect the release of fluid under pressure from this portion of the train brake pipe, and (ii) operable in response to the supply of fluid under pressure to the portion of the train brake pipe connected to said one end of the special car from the neutral position to a second position at the opposite side of the neutral position in which second position said selector valve means establishes a first communication between the portion of the train brake pipe connected to said one end of the special car and said opposite end of said control communication of said relay valve means whereby fluid under pressure flows from said portion of the train brake pipe to said control chamber, and a second communication between the portion of the train brake pipe connected to the opposite end of the special car and the opposite end of said delivery communication of said relay valve means whereby (1) upon operation of said valve mechanism of said relay valve means in response to said flow of fluid under pressure to said control chamber, fluid under pressure flows from the independent source of fluid under pressure to said portion of the train brake pipe connected to the opposite end of the special car via said delivery communication and said second communication in series and to said balancing chamber to establish therein a pressure corresponding to the pressure in said portion of the train brake pipe connected to said one end of the special car, or (2) upon the supply of fluid under pressure to the portion of the train brake pipe connected to the opposite end of the special car, to cause operation of said relay valve means to effect the release of fluid under pressure from this portion of the train brake pipe, and, (c) means responsive to pressure build-up above a chosen pressure in a chamber of fluid under pressure vented by said relay valve means from either portion of the train brake pipe in response to the supply of fluid under pressure to this portion, for effecting a reversal of the position of said selector valve means.

References Cited

UNITED STATES PATENTS

| | | | |
|---|---|---|---|
| 3,180,695 | 4/1965 | McClure | 303—86 |
| 3,232,677 | 2/1966 | Wilson et al. | 303—66 |
| 3,265,448 | 8/1966 | Newell | 303—86 |

DUANE A. REGER, Primary Examiner

U.S. Cl. X.R.

303—86